(12) United States Patent
Ikai

(10) Patent No.: US 6,847,598 B2
(45) Date of Patent: Jan. 25, 2005

(54) SERVO WITH DIGITAL FILTER TO CONTROL GAIN IN A FREQUENCY BAND WHERE OPEN LOOP CHARACTERISTIC IS HIGHER THAN THE PHASE CROSS-OVER FREQUENCY AND LOWER THAN RESONANCE FREQUENCY

(75) Inventor: Yoshiaki Ikai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 419 days.

(21) Appl. No.: 09/803,632

(22) Filed: Mar. 9, 2001

(65) Prior Publication Data

US 2002/0012189 A1 Jan. 31, 2002

(30) Foreign Application Priority Data

Jun. 30, 2000 (JP) .......................................... 2000-199549

(51) Int. Cl.[7] .............................................. G11B 5/596
(52) U.S. Cl. ............................... 369/44.34; 369/44.36; 708/309; 708/311; 360/78.09
(58) Field of Search .......................... 369/44.35, 44.36, 369/44.34; 360/78.09; 708/309, 311

(56) References Cited

U.S. PATENT DOCUMENTS

| | | | | |
|---|---|---|---|---|
| 4,667,315 A | * | 5/1987 | Fujii et al. ...................... | 369/44 |
| 5,325,247 A | * | 6/1994 | Ehrlich et al. ............. | 360/78.09 |
| 5,566,378 A | * | 10/1996 | Nagasawa et al. ........ | 360/77.16 |
| 5,610,487 A | * | 3/1997 | Hutsell ......................... | 318/560 |
| 5,880,953 A | * | 3/1999 | Takeuchi et al. ............. | 364/150 |
| 6,088,187 A | * | 7/2000 | Takaishi ................... | 360/78.05 |
| 6,198,246 B1 | * | 3/2001 | Yutkowitz .................... | 318/561 |
| 6,246,536 B1 | * | 6/2001 | Galloway ................. | 360/78.04 |
| 6,434,096 B1 | * | 8/2002 | Akagi et al. .............. | 369/44.32 |

FOREIGN PATENT DOCUMENTS

| | | |
|---|---|---|
| JP | 61-253649 | 11/1986 |
| JP | 5-333934 | 12/1993 |
| JP | 6-187655 | 7/1994 |
| JP | 2970679 | 8/1999 |

* cited by examiner

Primary Examiner—Doris H. To
Assistant Examiner—Gautam R. Patel
(74) Attorney, Agent, or Firm—Greer, Burns & Crain, Ltd.

(57) ABSTRACT

The present invention implements a servo system which can support changes of the higher resonance frequencies of the actuator with a simple configuration at low cost. The servo system comprises a head 3 which at least reads a disk 1, a carriage 5 which drives the head 3 to the track position of the disk 1, a detection circuit 9 which detects a positional error with respect to the track from the read output of the head, and the servo control unit 11 which controls the carriage such that the head follows up the track according to the positional error, wherein the servo control unit 11 further comprises a digital filter for increasing gain so that the open loop characteristic of the tracking servo system by the servo control unit has a gain higher than the open loop gain of the phase cross-over frequency f6 in a frequency area which is higher than the phase cross-over frequency f6 but lower than the higher resonance frequency f9 of the carriage and where the gain does not becomes 0dB or more at a frequency where phase is $(-180+360 \times N)°$. Since gain is increased, phase margin is increased.

15 Claims, 11 Drawing Sheets

FIG. 10

$$A = \begin{bmatrix} 1.1862 & -0.47357 & 0.14713 & 0.00549 & 0.11977 & -0.03906 \\ 2 & 0 & 0 & 0 & 0 & 0 \\ 0 & 2 & 0 & 0 & 0 & 0 \\ 0 & 0 & 0.5 & 0 & 0 & 0 \\ 0 & 0 & 0 & 1 & 0 & 0 \\ 0 & 0 & 0 & 0 & 1 & 0 \end{bmatrix}$$

$$B = \begin{bmatrix} 4 \\ 0 \\ 0 \\ 0 \\ 0 \\ 0 \end{bmatrix}$$

$$C = \begin{bmatrix} 1.1224 & -0.35375 & -0.32032 & 0.066793 & -0.04514 & 0.43441 \end{bmatrix}$$

$$A' = \begin{bmatrix} 1.1155 & -0.28879 & 0.1021 & -0.02999 & 0.081044 & -0.02423 \\ 2 & 0 & 0 & 0 & 0 & 0 \\ 0 & 2 & 0 & 0 & 0 & 0 \\ 0 & 0 & 0.5 & 0 & 0 & 0 \\ 0 & 0 & 0 & 1 & 0 & 0 \\ 0 & 0 & 0 & 0 & 1 & 0 \end{bmatrix}$$

$$B' = \begin{bmatrix} 2 \\ 0 \\ 0 \\ 0 \\ 0 \\ 0 \end{bmatrix}$$

$$C' = \begin{bmatrix} 1.6752 & -0.24774 & -0.59053 & 0.04576 & -0.13906 & 0.72112 \end{bmatrix}$$

$$D' = [3.4492]$$

SERVO WITH DIGITAL FILTER TO CONTROL GAIN IN A FREQUENCY BAND WHERE OPEN LOOP CHARACTERISTIC IS HIGHER THAN THE PHASE CROSS-OVER FREQUENCY AND LOWER THAN RESONANCE FREQUENCY

BACKGROUND OF THE INVENTION

1. Field of the Invention

The present invention relates to a storage device which reproduces/records information from/to a storage medium, a tracking control method, and a tracking control unit thereof.

2. Description of the Related Art

In a storage device such as an optical disk unit and a magnetic disk unit, a tracking control method is used where a relative position between a read head and a target track is detected and the signal is input to a head drive unit via an analog or digital controller, so that the head follows up the positional changes of the track.

As the price of storage device comes down, decreasing the number of components and the number of manufacturing steps is demanded for the disk unit. For this, a precision/coarse integrated type drive unit, where a precision actuator and a coarse actuator are not separated, is often used to configure a head drive unit.

For example, in order to implement low cost in the tracking control system of an optical disk unit, it is effective to perform tracking control and access control of the optical head by the thrust of a common coil. In other words, a precision actuator (used for tracking control and having a narrow movable range) and a coarse actuator (used for access control and having a wide movable range) are not disposed separately, but one actuator is used for driving for both precision and coarse controls, so that equipment cost can be decreased. A configuration example of equipment where tracking control and access control can be performed by one actuator, as mentioned above, has been disclosed in Japanese Patent Laid-Open No. S63-224037.

However, if a precision/coarse integrated type drive unit is used, robustness against the higher resonance of the head and follow-up to the eccentric vibration of the medium in a low frequency area must be implemented by only one feedback control unit.

It is difficult to implement these two requirements with the configuration of a general feedback controller. Because if a gain at a high frequency area is decreased to maintain robust stability against higher resonance, a phase near gain cross-over frequency delays, and the control band cannot be sufficiently increased.

For a feedback control unit, a digital filter using such a processor as DSP (Digital Signal Processor) is frequently used. In this case, the digital filter can calculate only at each sampling time Ts, so delay Ts/2 is generated to the tracking control system. The phase delay due to this delay time is also a cause which makes an increase in the control band difficult.

In other words, in the case of the above mentioned actuator which can control driving for both precision and coarse control, generally it is difficult to increase higher resonance frequency, so a gain of tracking control cannot be increased (gain cross-over frequency cannot be increased), and it is hard to support high-speed disk rotation.

To prevent the influence of higher resonance, it is possible to use a configuration where a twin T filter (notch filter) is inserted near the higher resonance frequency of the actuator. However, if a twin T filter where the dip frequency is low (close to the gain cross-over frequency) is inserted into the loop to be controlled, a large phase delay is generated at the gain cross-over frequency by the twin T filter, and phase margin decreases.

A method to solve this problem is stated in Japanese Patent Laid-Open No. H5-47125. In other words, an appropriate signal is input into the servo loop from outside, a resonance frequency is determined by the response of the servo system to the signal, and the notch filter is configured such that gain at this frequency becomes the minimum. With this method, the characteristics of the notch filter are optimized even if a variation of the resonance frequency initially disperses or temperature changes, so a narrow band notch filter with a large Q can be used, and little phase delay is generated near the gain cross-over of the servo loop.

However, an actuator generally has a plurality of resonance modes, so it is very difficult to correctly measure a higher resonance frequency to be the problem, from the response to the applied signal, as was proposed above.

When a narrow band notch filter is used, in particular, the attenuation characteristic differs greatly when there is a slight frequency change, so an error in measurement leads to the deterioration of servo characteristics and it is difficult to completely eliminate the influence of higher resonance. Also, to measure a higher resonance frequency, expensive hardware or complicated software are required separately, which increases cost.

In order to implement a servo system which can support the changes of higher resonance frequency by inserting a wide band notch filter with a small Q, where even if the higher resonance frequency of the actuator is close to the gain cross-over frequency and it is unavoidable that the dip frequency of the notch filter and the gain cross-over frequency are close to each other, the following proposal has been made (e.g. Japanese Patent Laid-Open No. H9-44863).

In the control system where a servo error signal is fed back to the actuator via the phase advance compensation circuit and the notch filter so as to create a control loop, the cross-over frequency (polar frequency) at the high frequency side of the phase advance compensation circuit is set to be higher than the frequency whereby the gain of the notch filter becomes the minimum (dip frequency). By this, the phase margin and the gain margin of the control loop can be guaranteed, and a constant and stable servo system can be implemented without complicated hardware and software, even if higher resonance frequency changes occur.

For storage products, such as an optical disk unit, increasing capacity and decreasing price must be pursued. Therefore, current disk units must satisfy two contradictory requirements: one is increasing the positioning accuracy of the head to several tens nm to accurately read and write data, and two, to keep the sampling frequency of the digital filter of the servo control system as low as possible, so that an inexpensive DSP can be used to decrease cost.

Keeping the sampling frequency low, in particular, increases the dead time of a digital filter, and makes the phase conditions of the control system strict, which make band improvement difficult.

According to the conventional tracking control method, as seen in Japanese Patent Laid-Open No. H9-44863 for example, the phases required for the feedback control system are secured by setting the cross-over frequency of the pole of the phase advance compensation to a position which is higher than the dip frequency (a frequency where gain becomes the minimum) of the notch filter. In order to obtain a sufficient phase margin with this method, however, a pole of the phase advance compensation must be set at a area frequency which is higher than the conventional value, so the sampling frequency of the digital filter must be set high. Therefore, it is required a high-speed digital circuit, such as high-speed DSP, and cost is increased.

SUMMARY OF THE INVENTION

With the foregoing in view, it is an object of the present invention to provide a storage device, tracking control method, and a tracking control unit for making the control band wide with a sufficient phase margin at the high frequency area, without increasing the sampling frequency.

It is another object of the present invention to provide a storage device, tracking control method, and a tracking control unit for implementing high precision tracking control with an inexpensive digital circuit.

It is still another object of the present invention to provide a storage device, tracking control method and a tracking control unit for implementing high precision tracking control using an inexpensive digital circuit by simply changing the characteristics of the digital filter.

According to the present invention, in a frequency area between a phase cross-over frequency f6 of the open loop characteristic of the servo control system and the resonance frequency f9 of the carriage, gain is increased to a position which is higher than the gain margin at f6 within a range where gain does not become 0dB or more at a point where the phase becomes $(-180+360\times N)°$ wherein, N=0, +−1, +−2 . . . . So, phase at the gain cross-over frequency is advanced, and the control band is improved.

Also according to the present invention, a feedback control unit is configured using a digital filter, which has a secondary pole to make the attenuation coefficient 1 or less, in an area between the phase cross-over frequencies f6 and f9 and in a frequency area where the phase of the open loop transfer function is −540° or more and −180° or less, and where the gain of the open loop transfer function at the frequency of the pole is increased to a position which is higher than the open loop gain at frequency f6. So phase at the gain cross-over frequency is advanced while maintaining stability equivalent to a conventional control unit, and the control band is improved.

Also according to the present invention, the gain of the open loop transfer function at the frequency of the pole of the digital filter is increased to a position higher than 0dB, so that the phase at the gain cross-over frequency is advanced while maintaining stability equivalent to a conventional control unit, and the control band is improved.

In the case of stability judgment by a Bode diagram, which is generally used for designing a controller, it is difficult to perform ordinary stability judgment when the phase is −180° or less and the gain is close to 0dB or 0dB or more. Actually, however, even if the phase of the open loop characteristic is −180° or less, the control system does not become unstable by the rise of the gain if in the −180° to −540° range. However, the control system becomes unstable if the gain becomes 0dB or more at −180°, −540°, −900°, . . . $(-180+360\times N)°$.

At a higher resonance of the head, the frequency and the Q value often disperse depending on the product, so if the controller is designed such that the open loop gain near the higher resonance is close to 0dB or 0dB or more, it is quite possible that yield at manufacturing aggravates. However, the transfer characteristic of the digital filter is not changed by the dispersion of the product and the elapsed time, so the digital filter has no influence on yield aggravation.

Therefore when gain is intentionally raised by the digital filter, as in the feedback control unit of the present invention, phase can be advanced by the rise of gain while sufficiently maintaining stability, and the control band can be improved as a result.

BRIEF DESCRIPTION OF THE DRAWINGS

FIG. 10 is a diagram depicting the constant matrix of processing in FIG. 9; and

FIG. 11 is a diagram depicting the constant matrix of an example to compare with the embodiment in FIG. 10.

DESCRIPTION OF THE PREFERRED EMBODIMENTS

Embodiments of the present invention will now be described in the sequence of a tracking control system, a digital filter, and other embodiments, with reference to the accompanying drawings.

Tracking Control System

Figure 1:
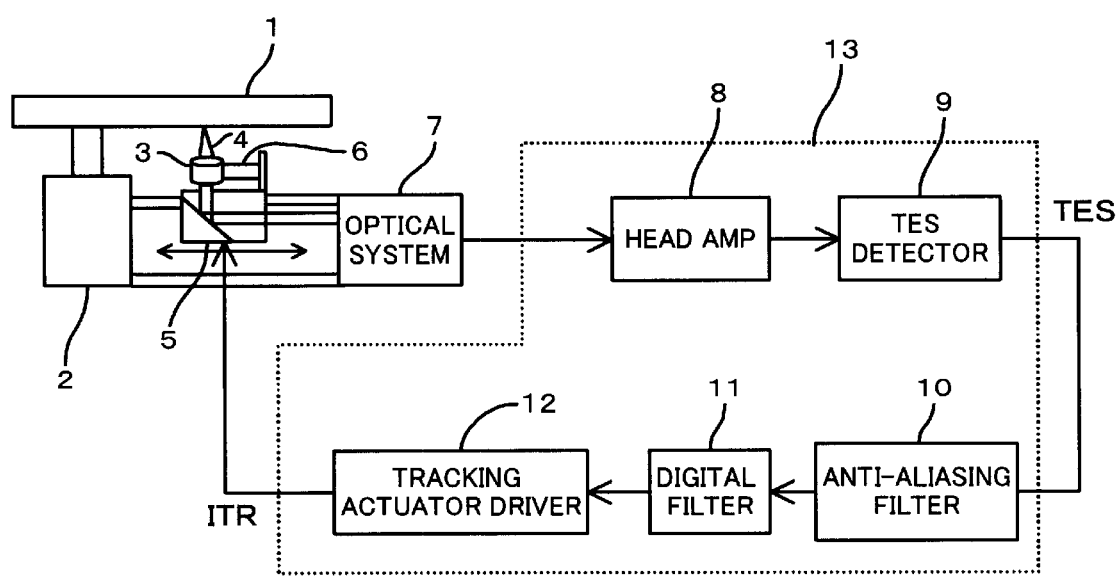
FIG. 1 is a block diagram depicting the configuration of the tracking control system in an optical disk unit according to an embodiment of the present invention.
Figure 2:
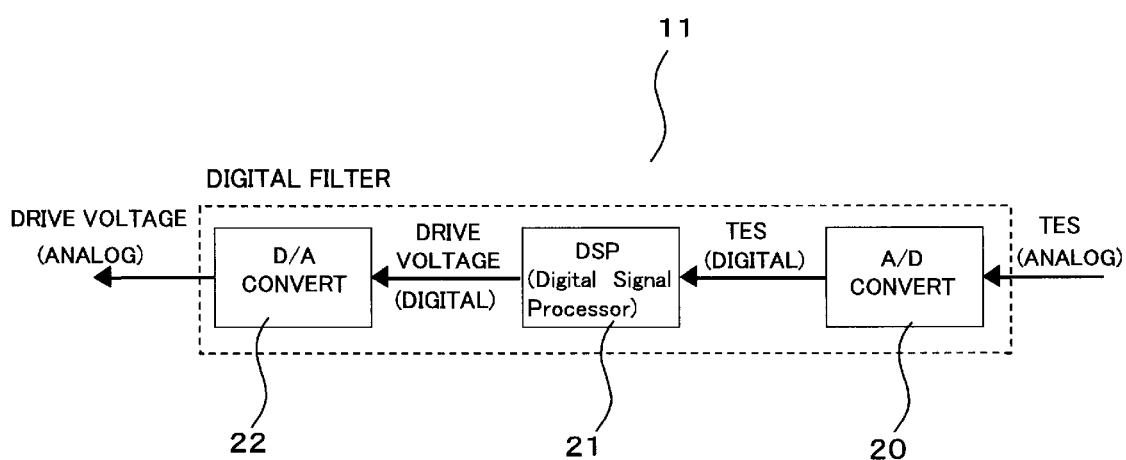
FIG. 2 is a block diagram of the digital filter in FIG. 1.

FIG. 1 is a block diagram depicting the configuration of the tracking control system of the optical disk unit according to an embodiment of the present invention, and FIG. 2 is a block diagram of the servo control unit (digital filter) thereof. Here, the parts which are not directly related to the description of the present embodiment, such as a reproducing signal processing circuit, an interface circuit with the host computer, and a focus control circuit, are omitted.

As FIG. 1 shows, the optical disk unit, where an optical disk 1 having information tracks to record information is set, has a spindle motor 2 which rotates to drive the optical disk 1. In the optical disk unit, the optical head for recording and reproducing information to/from the optical disk 1 is comprised of an objective lens 3 for emitting an optical beam 4 onto the information track of the optical disk 1, a focus actuator 6 which is a focus moving means for driving the objective lens 3 to the optical axis direction (vertical direction in FIG. 1, focusing direction), a carriage (actuator) 5 which mounts the objective lens 3 and the focus actuator 6, and can move in the radius direction of the optical disk 1, and an optical system 7 which includes a laser diode to be a light source and a photo-detector.

The tracking control circuit 13 of the present embodiment is comprised of a head amplifier 8 which amplifies the output current of the photo-detector, a tracking error signal detection circuit (TES detection circuit) 9 which detects a tracking error signal from the output of the photo-detector, a low pass filter (anti-aliasing filter) 10 which removes the high frequency component of TES to stabilize the tracking control system, a digital filter (servo control part) 11 which generates a servo control signal from a tracking error signal, and a tracking actuator driver 12 which supplies the drive current to a coil for driving the carriage 5 based on the output signal of the digital filter 11.

This carriage 5, along with the objective lens 3 and the focus actuator 6, can move in a direction to cross the information track on the optical disk 1 (horizontal direction in FIG. 1, tracking direction) by the drive current ITR supplied from the tracking actuator driver 12, so that the optical beam 4 can be emitted onto all the information tracks. The carriage 5, for example, has a voice coil motor.

In this configuration of the carriage 5, the focus actuator 6 is comprised of, for example, a holder to secure the objective lens 3, a plate spring to support the objective lens 3 so as to be movable in the focusing direction and roughly fixed in the tracking direction, and a focus coil for driving the objective lens 3. The focus actuator 6 is mounted on the top of the carriage 5, and on both sides of the carriage 5 a tracking coil is attached as a carriage driving means for driving the carriage.

By structuring the optical head by the carriage 5 with the above configuration where the guide shaft and the magnetic circuit are assembled along with the carriage 5, the focus actuator 6 can be driven in the focusing direction when current is supplied to the focus coil, and the carriage 5 is driven in the tracking direction when current is supplied to the tracking coil. The optical beam 4 is also moved in the tracking direction by driving the carriage 5, so the tracking actuator is configured by this configuration.

As FIG. 2 shows, the digital filter (servo control part) 11 is comprised of an AD converter 20 which converts the analog track error signal TES to the digital value, a DSP (Digital Signal Processor) 21 which processes this digital value, and a DA converter 22 which converts the digital drive voltage of the DSP 21 to the analog drive voltage.

Now operation of the tracking control system configured as above will be described. At first, the spindle motor 2 is rotated at a predetermined speed by the motor control circuit, which is not illustrated, and the laser diode included in the optical system 7 is emitted at a predetermined output by the drive control of the laser control circuit, which is not illustrated.

Then the focus actuator 6 is driven and controlled by the focus control circuit, which is not illustrated, and the position of the objective lens 3 in the focusing direction is controlled so that the optical beam 4 focuses on the information track of the optical disk 1. The reflected light of the optical beam 4 from the optical disk 1 is received by the photo-detector of the optical system 7, is amplified by the head amplifier 8, and is output to the tracking error signal detection circuit 9.

In this status, the tracking error signal detection circuit 9 generates the tracking error signal TES, which indicates how much the optical beam 4 deviated from the center of the information track, based on the output of the photo-detector. Normally, the tracking error signal becomes zero level at the center of the information track and roughly at the mid-point of the tracks, and changes sinusoidally with respect to the displacement of the optical beam.

The tracking error signal of the output of the tracking error signal detection circuit 9 is processed by the digital filter 11 after the high frequency component (noise component) is removed by the low pass filter 10, and is negatively fed back to the carriage 5 by the tracking actuator driver 12 as the drive current ITR. By this drive current ITR, the carriage 5 is driven in a direction to correct the positional deviation of the optical beam 4 detected by the tracking error signal detection circuit 9.

By feeding back the tracking error signal to the tracking coil which drives the carriage in this way, the tracking direction of the optical beam 4 is driven so that the tracking error signal becomes zero, and tracking is controlled so that the optical beam 4 follows up to the center of the information track.

Figure 3:
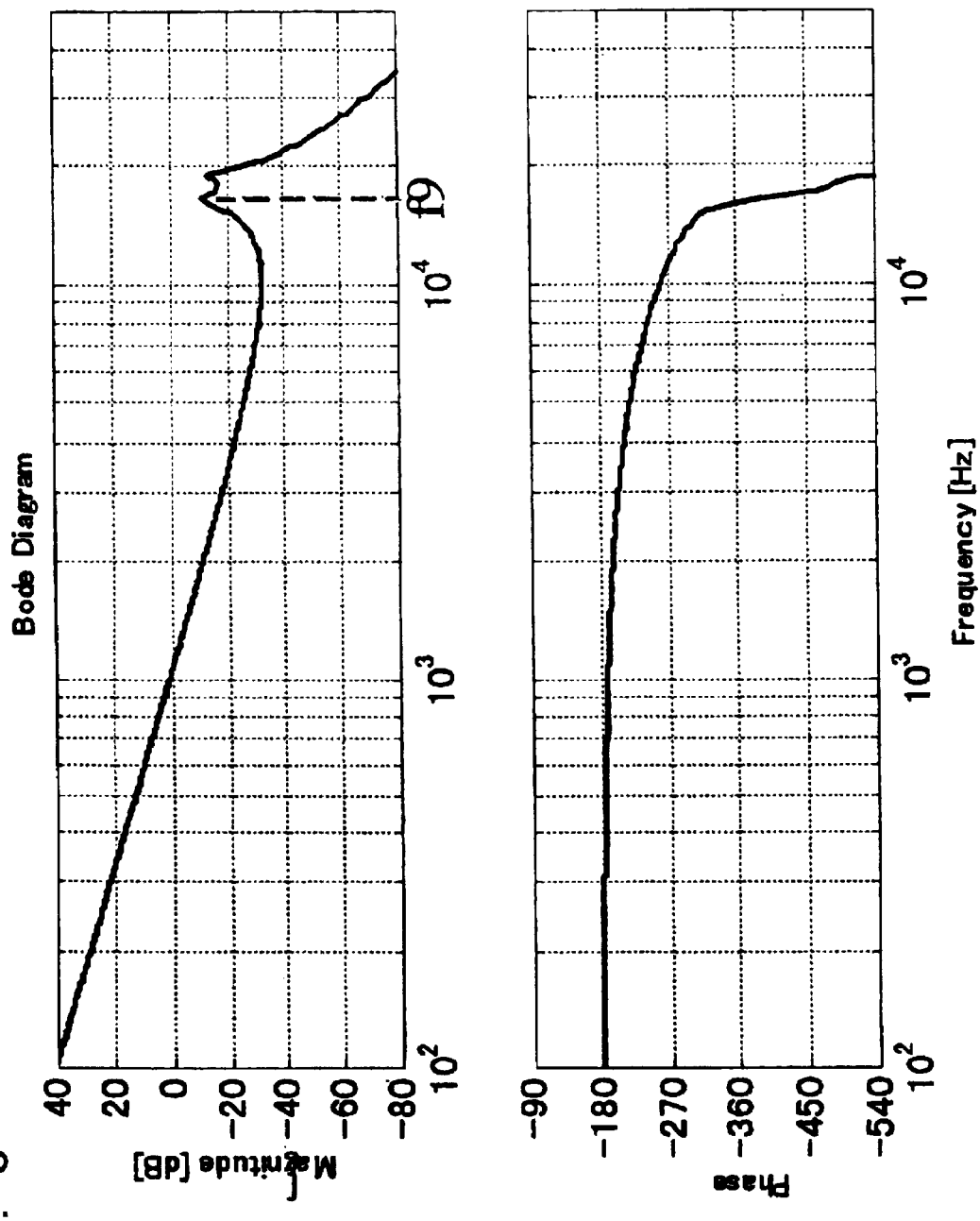
FIG. 3 is a frequency characteristic diagram of the carriage in FIG. 1.

Now the setup of the digital filter 11 will be described with reference to FIG. 3 to FIG. 5. FIG. 3 is a frequency transfer characteristic diagram of the carriage (actuator), FIG. 4 is a frequency transfer characteristic diagram of the digital filter, and FIG. 5 is an open loop frequency transfer characteristic diagram of the tracking control system.

Description here assumes that the frequency characteristic of the tracking direction displacement of the optical beam 4, when the carriage 5 is driven by current, is a quadratic integral system where the resonance point is at the frequency f9 near 10 kHz. The resonance near 10 kHz, is for example, the resonance of the carriage 5 itself, or is the resonance of the plate spring supporting the objective lens 3 for focusing in the tracking direction (stretching direction of the plate spring). The top diagram in FIG. 3 is the frequency-gain characteristic diagram, and the bottom diagram is the frequency-phase characteristic diagram.

Figure 4:
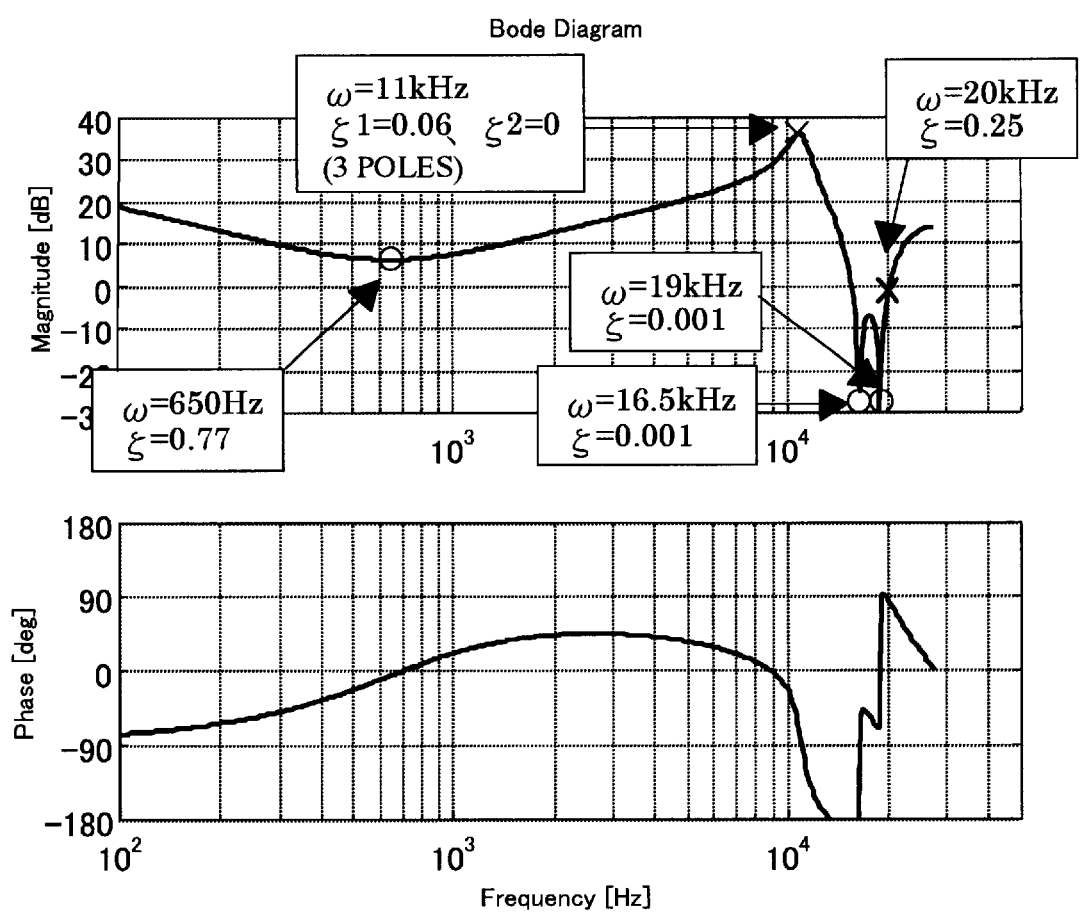
FIG. 4 is a frequency characteristic diagram of the digital filter in FIG. 1.
Figure 5:
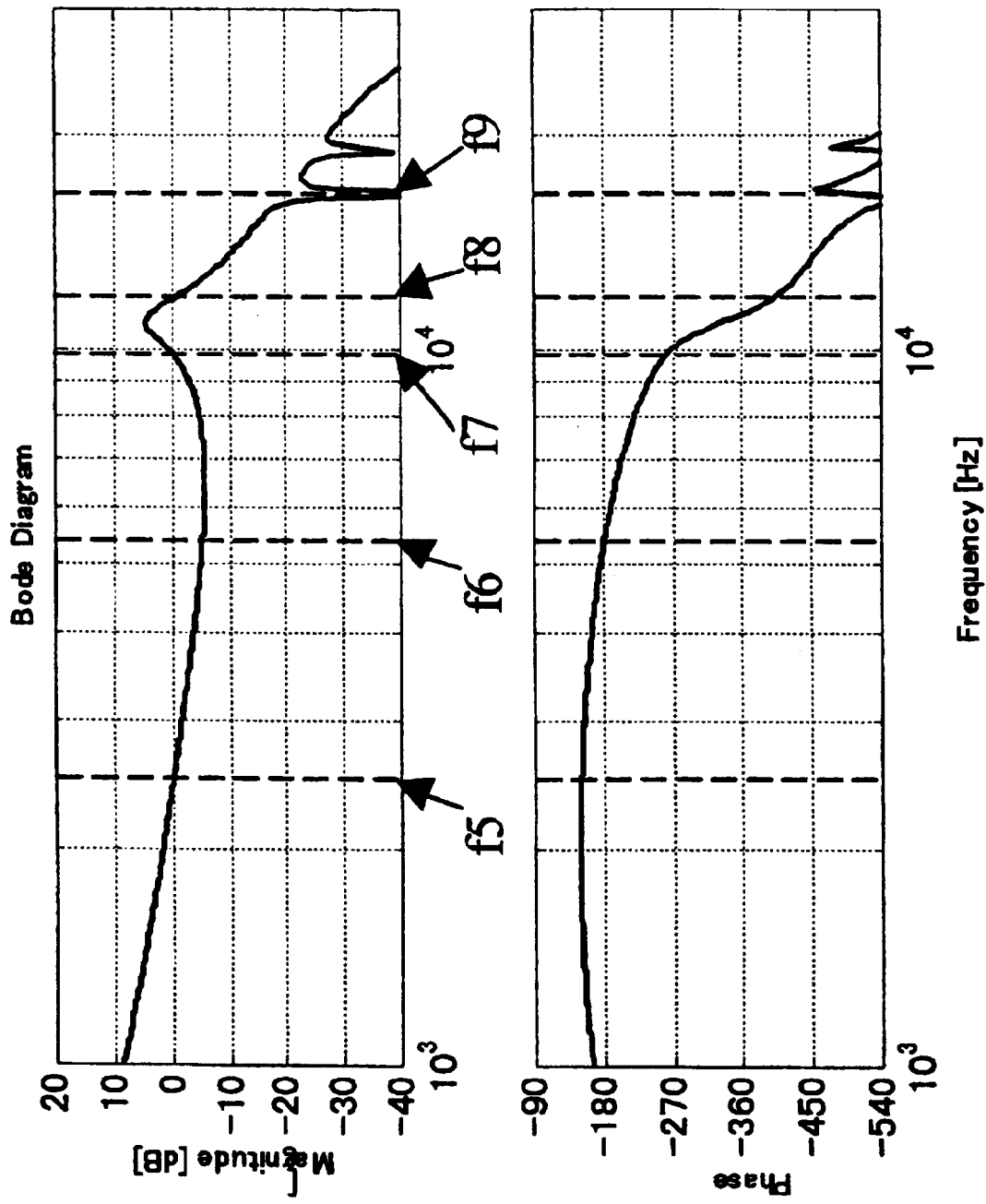
FIG. 5 is an open loop characteristic diagram of the tracking system in FIG. 1.

By setting the frequency transfer characteristic of the digital filter 11 of the feedback system in FIG. 4, the open loop frequency characteristic (open loop transfer characteristic) on the gain and the phase of the tracking control system shown in FIG. 5 is finally obtained.

In the open loop characteristic diagram in FIG. 5, the open loop characteristic of the tracking servo system by the servo control part (digital filter) 11 has a frequency transfer characteristic where the phase is more than −180° at the frequency f5 where the gain becomes zero first (the first gain cross-over frequency), and the gain is less than 0dB at the second phase cross-over frequency f6 (frequency at which phases cross over at −180°), which is higher than f5. The gain is more than 0dB at the first phase cross-over frequency f4, which is lower than f5, and is not illustrated here.

According to the present invention, the digital filter 11 is set such that gain is increased to a position higher than the open loop gain at f6, in a range where the gain does not become 0dB or more at a point where the phase is (−180+360×N)°, at the frequency areas f6–f9 which is higher than f6 and lower than f9, a frequency closest to f6 among the higher resonance frequencies of the carriage 5. Here, N=0, ±1, ±2 . . .

The digital filter 11, which has the above configuration, has a secondary pole where the attenuation coefficient is 1 or less in the area between frequency f6 and f9, and is within the frequency area where the phase of the open loop transfer function is more than −540° and less than −180°, as shown in FIG. 4, and this digital filter 11 can be easily implemented by increasing the gain of the open loop transfer function at the frequency of the pole to a position higher than the open loop gain at the frequency f6. It is preferable to increase the gain of the open loop transfer function at the frequency of the pole to a position higher than 0dB.

In other words, by intentionally increasing the gain of the open loop transfer function by the digital filter 11 in the −180°∼−540° phase range, the increase of the gain advances the phases and improves the control band. Increasing gain does not impair safety for reasons that will be described later with reference to FIG. 7 and FIG. 8. In other words, the control band can be improved by the transfer characteristic of the digital filter 11, and it is unnecessary to increase the sampling frequency.

In the higher resonance of the head, the frequency and the Q value disperse depending on the product, so if the controller is designed such that the open loop gain near the higher resonance is close to or more than OdB, yield tends to aggravate at manufacturing. In the case of the digital filter, however, the transfer characteristic does not disperse depending on the product, and the transfer characteristic does not change as time elapses, so yield does not aggravate.

A specific example will be used for description. In the open loop characteristic in FIG. 5, the phase margin (phase from −180°) at the gain cross-over frequency f5 (2.3 kHz) is about 30°, and the gain margin at the second phase cross-over frequency f6 (5.2 kHz) is about 5 dB, so there are no stability problems. The resonance point of the head is at the position of frequency f9 (16.4 kHz), and a large gain rise, which is the feature of the present invention, is generated between f6 and f9. This is because of the function of the pole (attenuation coefficient 0.06) at the frequency 11 kHz of the digital filter 11 shown in FIG. 4.

In this example, the gain characteristic exceeds OdB, particularly from frequency f7 to f8. The feedback circuit, however, is stable since the phase at f7 is about −250°, and the phase at f8 is about −410°, and during this time the phase does not become −180° or −540°.

Such a digital filter 11 can be automatically designed by, for example, H∞ control theory. If the transfer characteristic of the digital filter 11 shown in FIG. 4 is represented by the transfer function of the continuous system, the zero points and the poles of the digital filter 11 are as follows.

Zero points
−119.38±1.1938e5 i (ω=19 kHz, ζ=0.001)
−103.67±1.0367e5 i (ω=16.5 kHz, ζ=0.001)
−103.67±1.0367e5 i (ω=650 Hz, ζ=0.77)
Poles
0 (integrator)
−31416±1.2167e5 i (ω=20 kHz, ζ=0.25)
−4146.9±68991 i (ω=11 kHz, ζ=0.06)
−69115 (ω=11 kHz)

Of this, four zero points arranged at ω=19 kHz and 16.5 kHz are set such that the attenuation coefficient ζ becomes extremely small (0.001), and function as the notch filter. The zero point at ω=650 Hz and three poles at ω=11 kHz function as the high pass filter. In this embodiment, the attenuation coefficient ζ of two poles at ω=11 kHz is set to "0.06", which is smaller than the conventional attenuation coefficient "0.25". In the case of a zero point, gain decreases as the attenuation coefficient decreases, but in the case of a pole, decreasing the attenuation coefficient increases gain, therefore the rise of gain can be created.

Figure 6:
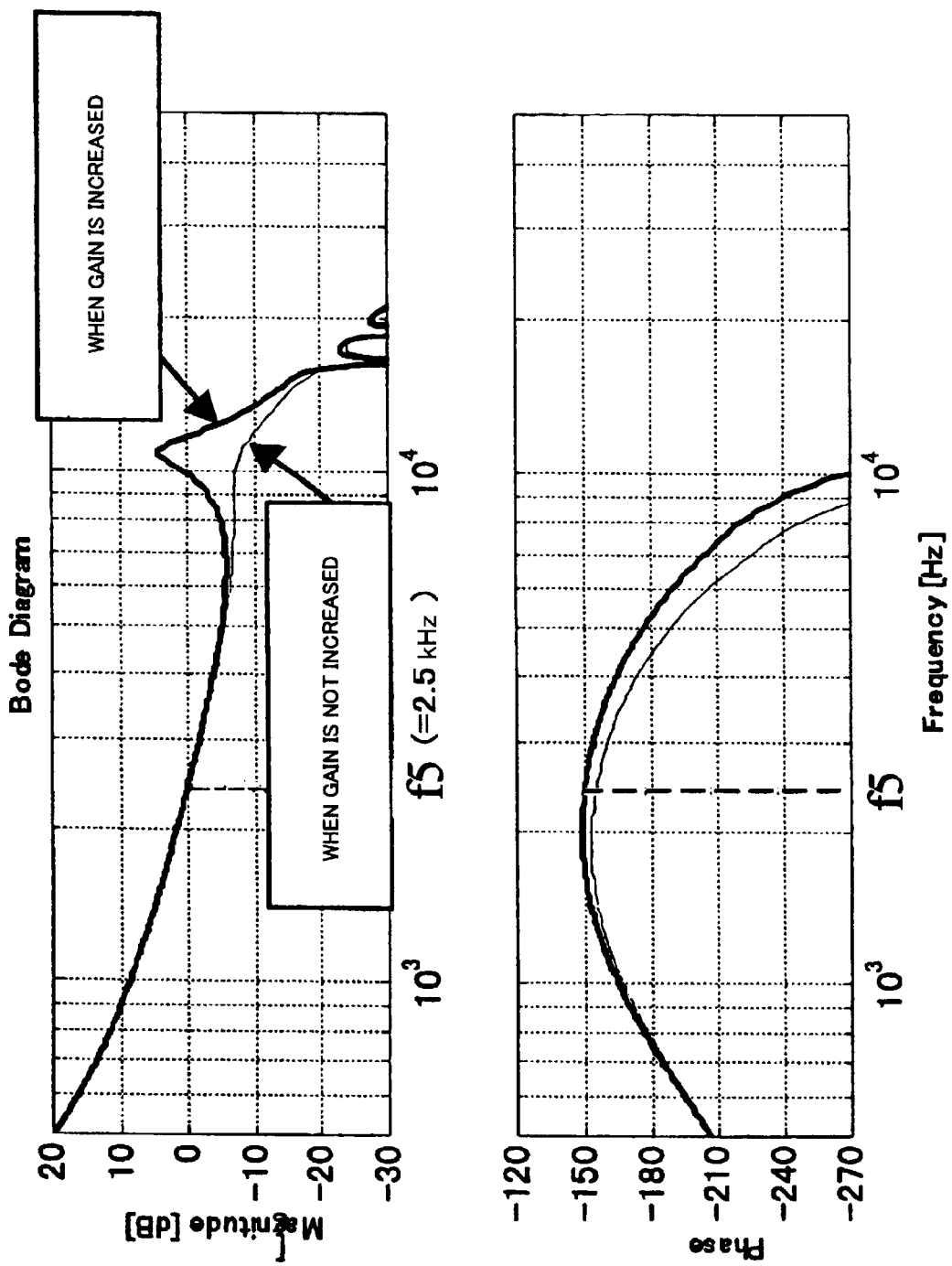
FIG. 6 is a frequency characteristic diagram depicting the effect of the characteristics in FIG. 1.

To confirm the effect of the present invention, FIG. 6 shows a comparison between the open loop transfer characteristic when there is no rise of gain (thin line in FIG. 6), and the open loop transfer characteristic of the present invention (thick line in FIG. 6) shown in FIG. 5.

If there is no rise of gain, shown by the thin line in FIG. 6, the phase at the gain cross-over frequency f5 (=2.5 kHz) decreases about 5°, so the control band must be decreased to obtain a phase margin similar to that in the case of when there is a rise of gain, shown by the thick line in FIG. 6. In other words, by the effect of the present invention, the control band can be improved while guaranteeing stability.

Figure 7:
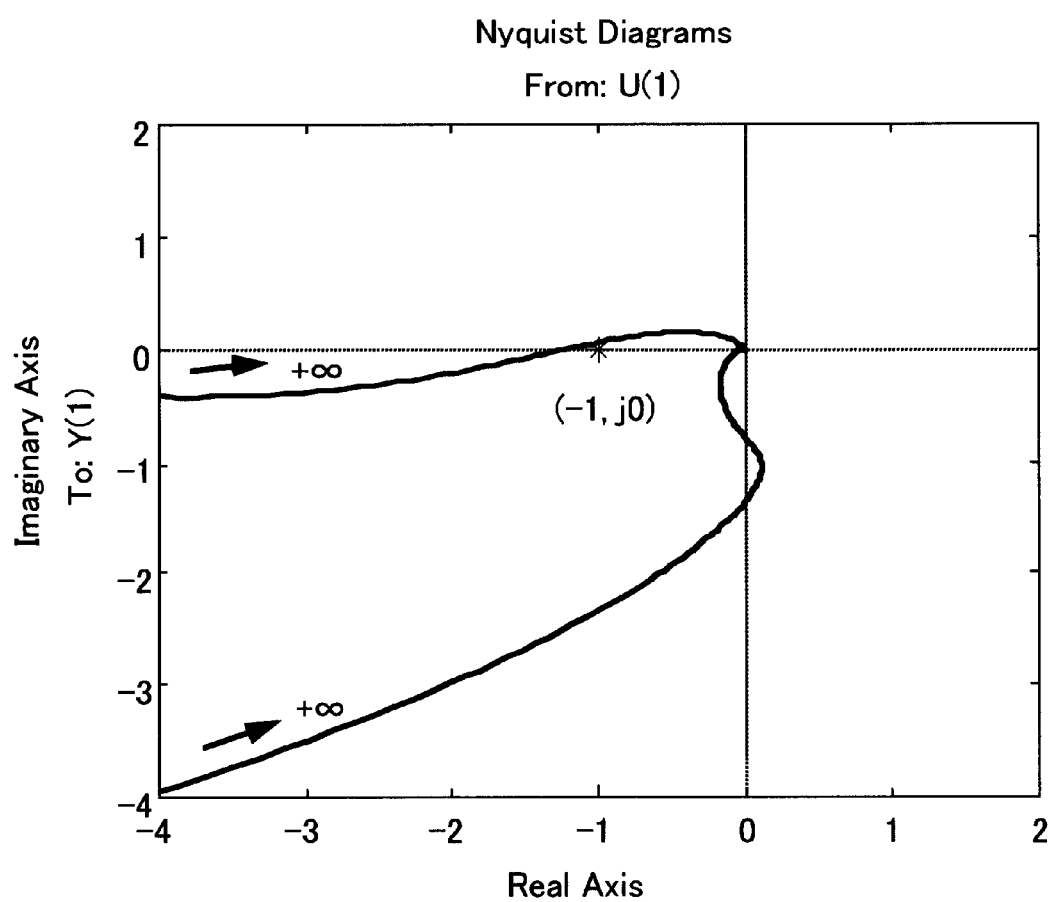
FIG. 7 is a Nyquist diagram depicting the stability of the system according to the present invention.

Now the reason why the control system is stable in the area where phase is −180° or less in the Bode diagram in FIG. 5, even if gain exceeds OdB, will be described with reference to FIG. 7 and FIG. 8.

In the design of the feedback controller, it is difficult to judge stability by the Bode diagram, which is generally used for stability judgment, when the phase is −180° or less and gain is close to OdB or exceeds OdB. However, according to the research by the present inventor, the feedback system becomes unstable if gain becomes OdB or more at points where phase is −180°, −540°, −900°, . . . (−180+360×N)°, but at a phase other than these, the system does not become unstable even if gain rises.

This reason will now be described with reference to the Nyquist diagrams in FIG. 7 and FIG. 8, because stability judgment using a Nyquist diagram can be more intuitively understood than the stability judgment by a Bode diagram.

Stability judgment by a Nyquist diagram has been introduced in many textbooks on classical control, such as "Automatic Control" written by Norio Minagami (published by Asakura Bookstore), Chapter 7, Section 4 (pp. 157–167), which deals with general theory. According to the judgment method stated on p. 164 of "Automatic Control", when the vector locus of the open loop transfer function is traced in the direction where the (frequency) ω increases from 0 to +∞, the control system is stable if the point (−1, j0) is at the left side thereof, and is unstable if at the right side. In other words, the thick line in FIG. 7 is stable, but the thin line is unstable.

Figure 8:
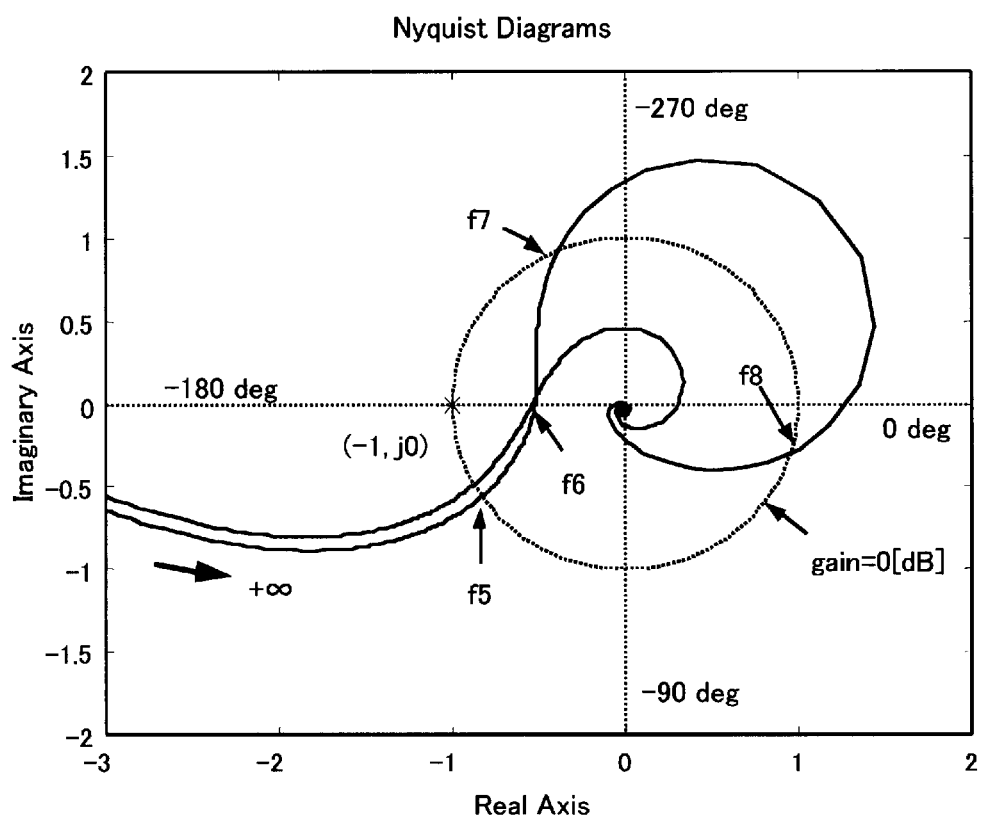
FIG. 8 is a Nyquist diagram depicting the stability of the frequency characteristic according to the present invention.

FIG. 8 shows Nyquist diagrams indicating an open loop transfer function of a prior art where gain does not rise, described in FIG. 6, indicated by the thin line, and an open loop transfer function of the present invention where gain rises, indicated by the thick line. In FIG. 8, f5–f8 correspond to the above mentioned frequencies in FIG. 5.

In these Nyquist diagrams, the circle (dotted line in FIG. 8) having radius 1 from the origin (0, j0) corresponds to the gain=OdB of the Bode diagram, and the angle from the positive direction in the x axis of the Nyquist diagrams corresponds to the phase of the Bode diagram. In other words, the negative direction in the y axis is (−90+360×N)°, the negative direction in the x axis is (−180+360×N)°, and the positive direction in the y axis is (−270+360×N)°. Therefore, the above mentioned gain cross-over frequencies f5, f7 and f8 in FIG. 5 are dots on the circle with the radius 1 on the Nyquist diagrams, and the phase cross-over frequency f6 is the intersection with the negative direction in the x axis.

Therefore if the phase is more than −180° at a frequency where gain is OdB, and gain is less than OdB at a frequency where phase is more than −180°, which are the above mentioned stability conditions in the Bode diagram, then the point (−1, j0) naturally comes to the left of the locus on the Nyquist diagrams, which satisfies the stability conditions in the Nyquist diagrams. If stability conditions in the Nyquist diagrams are not satisfied, on the other hand, the gain exceeds OdB at the frequency where the phase is (−180+360×N)°.

Considering the stability conditions in the Nyquist diagrams in this way, there are no stability problems even if gain rises after the −180° line is crossed once, like the case of the thick line of the present invention shown in FIG. 8, only if the gain is decreased to OdB or less again before −540° which crosses the x axis in the negative direction the next time, that is, only if the locus is returned to the range inside the circle with the radius 1 in FIG. 8. In other words, security can be guaranteed even for the open loop transfer function shown in the Bode diagram, where gain rises, as shown in FIG. 5 and FIG. 6.

In this way, by intentionally raising the gain of an open loop transfer function between −180°—−540° phase by the digital filter 11, phase can be advanced due to the increase of gain, and the control band can be improved. Even if the gain is increased, the stability of the system is not lost if the phase range is in the −180°—−540° for the above mentioned reasons. In other words, the control band can be improved by the transfer characteristic of the digital filter 11, and sampling frequency need not be set high.

In other words, the present invention can improve the control band while guaranteeing stability. Therefore high precision tracking control can be implemented with a digital filter which has a low sampling frequency without installing a digital filter which has a high sampling frequency. By this, a high-density recording disk device can be provided at low cost.

In the above embodiment, a disk unit was described using an optical disk unit as an example. This optical disk unit includes a known storage device using light, such as a magneto-optical disk unit, DVD unit and CD unit. The above embodiment can also be applied to a magnetic disk unit, and can be applied not only to a recording/reproducing unit but also to a dedicated reproducing unit.

Digital Filter

Figure 9:
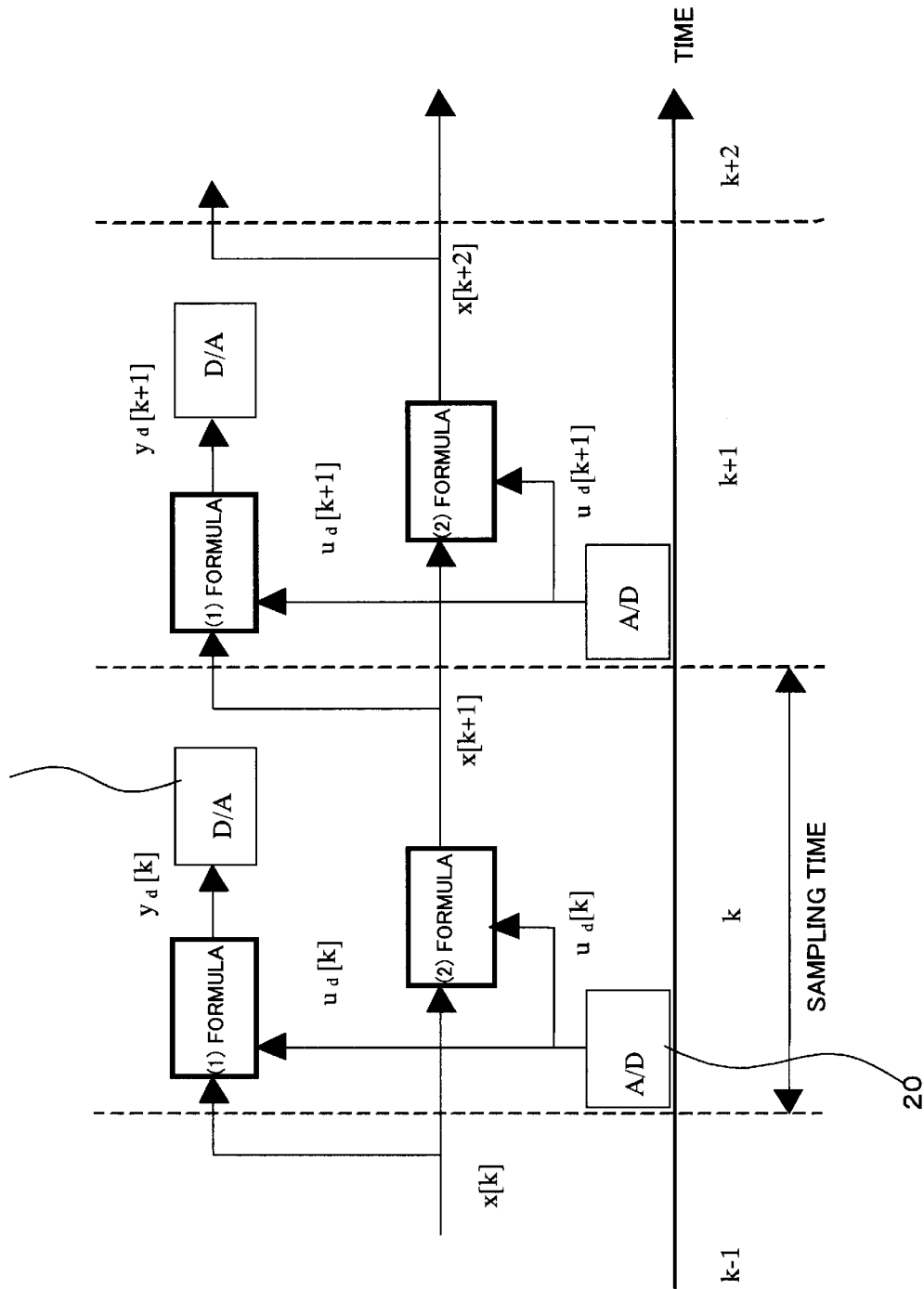
FIG. 9 is a processing flow chart of the digital filter in FIG. 2.

Now a configuration example of a digital filter to implement the above mentioned transfer characteristic will be described. FIG. 9 is a diagram depicting the filter processing of the DSP 20 in FIG. 2.

At first, in the hardware configuration of the digital filter 11, the A/D converter 20 converts the analog signal TES to a digital signal at a predetermined sampling time T, as shown in FIG. 2. Then the DSP (Digital Signal Processor) 21 calculates the drive voltage based on the digital signal of the converted TES. Finally, the drive voltage is converted to the analog voltage signal by the D/A converter 22, and is output to the actuator driver 12 in FIG. 1.

The following two formulas are used for the operations performed by the digital filter (DSP 21).

$$yd[k] = C \times x[k] + D \times ud[k] \quad (1)$$

$$x[k+1] = A \times x[k] + B \times ud[k] \quad (2)$$

Here ud [k] is an input signal at the sampling point k (TES in this case), yd [k] is an output signal (drive voltage in this case), x [k] is an internal variable of the DSP 21, called the state variable, and A, B, C and D are the constants (matrixes).

FIG. 9 shows the processing flow of the DSP 21. At first, formula (1) is calculated by the input ud [k] from the A/D converter 20, and the state variable x [k] is calculated at the previous sampling point [k−1], and the result yd [k] is output to the D/A converter 22. Then the formula (2) is calculated by ud [k] and x [k], and the state variable x [k+1] is calculated at the next sampling point [k+1]. This is repeated at each sampling time T, so as to implement a digital filter having certain frequency characteristics.

The transfer characteristic of the controller (digital filter 11) shown in FIG. 4 is represented by the transfer function of the continuous system as the formula (3).

$$k \frac{(s^2 + 2\zeta_{n1}\omega_{n1}s + \omega_{n1}^2) \cdot (s^2 + 2\zeta_{n2}\omega_{n2}s + \omega_{n2}^2) \cdot (s^2 + 2\zeta_{n3}\omega_{n3}s + \omega_{n3}^2)}{s \cdot (s^2 + 2\zeta_{d1}\omega_{d1}s + \omega_{d1}^2) \cdot (s^2 + 2\zeta_{d2}\omega_{d2}s + \omega_{d2}^2) \cdot (s + \omega_{d3})} \quad (3)$$

Here k=11.22, and as mentioned above, zero points are indicated by $\omega_{n1}$=650 Hz, $\zeta_{n1}$=0.77, $\omega_{n2}$=16.5 Hz, $\zeta_{n2}$=0.001, $\omega_{n3}$=19 kHz and $\zeta_{n3}$=0.001, and poles are defined as $\omega_{d1}$=11 kHz, $\zeta_{d1}$=0.06, $\omega_{d2}$=20 kHz, $\zeta_{d2}$=0.25 and $\omega_{d3}$=11 kHz.

In order to implement the transfer function in the formula (3) by the digital filter, the formula (3) is first converted to the equation of state of the continuous system, then the equation of state is converted to the equation of state of the discrete system (above mentioned formulas (1) and (2)).

A method to convert the transfer function to the equation of state of the continuous system was introduced in Chapter 2 of "Mechanical System Control" (published by Ohm) written by Katsuhisa Furuta et al. A method to convert the equation of state of the continuous system to the equation of state of the discrete system was also introduced in Chapter 4 of this book. By using such commercial software as MATLAB (provided by MathWorks), the respective conversion can be easily executed.

When the formula (3) is converted to the equations of state of the discrete system (1) and (2), the constant matrixes A, B, C and D, to determine the transfer characteristic of the digital filter, becomes like FIG. 10. The sampling frequency is 55 kHz. As this embodiment shows, when there is one input signal and one output signal and the order of the transfer function is 6, the matrix of A is 6 rows and 6 columns, B is 6 rows and 1 column, C is 1 row and 6 columns, and D is 1 row and 1 column. The state variable x [k] is a column vector with 6 rows and 1 column.

The transfer function where gain does not rise, shown as a comparison example to compare the effect of the invention in FIG. 6, on the other hand, has the characteristic where the parameter $\zeta_{d1}$ of the transfer function of the formula (3) is changed from 0.06 to 0.25. In this case, the characteristic is changed merely by changing one parameter in the formula (3), but in the case of the equation of state, such as formulas (1) and (2), many parameters of the A~D matrixes must be changed.

A', B', C' and D' in FIG. 11 show the constant matrixes of this comparison example where gain does not rise. Compare this with the above mentioned A~D. When the control system is actually designed, the control system is generally designed in the format of the formula (3) first, then is converted to the format of the formulas (1) and (2) by CAD software, such as MATLAB, and it is rare to directly change the component of the constant matrixes A~D.

Other Embodiments

In the above embodiment, the precision actuator and the coarse actuator are integrated as one actuator, but a conventional type actuator, where a precision actuator is installed on top of a coarse actuator, can be used when the higher resonance frequency is relatively low with respect to the gain cross-over frequency. Need less to say, the present invention can be applied not only to the tracking actuator but also to other actuators, such as a focus actuator.

Filter processing in the digital filter may be performed not by DSP but by another digital circuit. It is preferable to use DSP, however, in order to guarantee the accuracy of the filter by high-speed processing.

The digital filter described above is a digital filter where phase advancement compensation, phase delay compensation and notch filter are integrated, but these may be separated. The storage medium described above is a disk, but may be a card.

As described above, the following effects are seen according to the present invention.

(1) At a frequency area between the phase cross-over frequency f6 of the open loop characteristic of the servo control system and the resonance frequency f9 of the actuator, phase at the gain cross-over frequency can be advanced and the control band be improved without increasing the sampling frequency by increasing the gain to a position higher than the gain margin at f6 within a range where the gain does not become 0dB or more at a point where the phase becomes $(-180+360 \times N)°$.

(2) Since the control system becomes unstable if gain becomes 0dB or more at the points of $-180°$, $-540°$, $-900°$, ... $(-180+360 \times N)°$, the gain is increased in a range excluding the above points, therefore the stability of the system can be maintained.

(3) In the higher resonance of the head, the frequency and the Q value often disperse depending on the product, so if a controller is designed such that the open loop gain near the higher resonance is close to 0dB or 0dB or more, it is likely that yield at manufacturing aggravates, but by using a digital filter, which transfer characteristic does not change depending on the dispersion of the product, and on the elapse of time, there is no influence on the aggravation of yield.

(4) By using this tracking control for a storage device, the reliability of reproduction and recording can be improved, a higher track pitch can be implemented, and a higher density becomes possible.

The present invention has been described by the above embodiments, but various modifications are possible within the scope of the present invention, and these variant forms are not excluded from the scope of the present invention.

What is claimed is:

1. A storage device comprising:
   an actuator for driving a head which at least reads a recording medium to a track position of a storage medium;
   a detection circuit for detecting a positional error with respect to said track from the read output of said head; and
   a servo control unit for controlling said actuator so that said head follows up said track according to said positional error,
   wherein said servo control unit has a digital filter to increase gain in a frequency area where an open loop characteristic of a tracking servo system by said servo control unit is higher than a phase cross-over frequency f6 and is lower than the higher resonance frequency f9 of said actuator, such that the gain becomes higher than the open loop gain of said phase cross-over frequency f6 in a range where the gain does not become 0dB or more at a frequency where phase becomes $(-180+360 \times N)°$.

2. The storage device according to claim 1, wherein said digital filter is a filter for increasing gain such that gain is higher than the open loop gain at said phase cross-over frequency f6 in a frequency area where the open loop characteristic of said tracking servo system is higher than the phase cross-over frequency f6 and is lower than the higher resonance frequency f9 of said carriage, and phase becomes less than $-180°$ and more than $-540°$.

3. The storage device according to claim 1, wherein said digital filter is a filter for increasing said gain so that said open loop gain becomes 0dB or more in said frequency area.

4. The storage device according to claim 1, wherein said digital filter has a pole to increase said open loop gain in said frequency area.

5. The storage device according to claim 1, wherein said digital filter comprises a processor for sampling said positional error at a predetermined sampling cycle and for executing digital filter processing.

6. A tracking control method for controlling an actuator for driving a head which at least reads information of a storage medium to a track position of said storage medium, comprising:
   a step of detecting a positional error with respect to said track from the read output of said head; and
   a servo control step of controlling said actuator such that said head follows up said track according to said positional error,
   wherein said servo control step comprises a digital filter processing step for increasing gain in a frequency area where an open loop characteristic of a tracking servo system by said servo control step is higher than the phase cross-over frequency f6 and is lower than the higher resonance frequency f9 of said carriage, such that the gain becomes higher than the open loop gain of said phase cross-over frequency f6 in a range where the gain does not becomes 0dB or more at a frequency where the phase becomes $(-180+360 \times N)°$.

7. The tracking control method according to claim 6, wherein said digital filter processing step is a step for increasing a gain so that the open loop characteristic of said tracking servo system has a gain higher than the open loop gain of said phase cross-over frequency f6 in a frequency area which is higher than the phase cross-over frequency f6, lower than the higher resonance frequency f9 of said carriage, and where phase is less than $-180°$ and more than $-540°$.

8. The tracking control method according to claim 6, wherein said digital filter processing step is a filter processing to increase said gain so that said open loop gain becomes 0dB or more in said frequency area.

9. The tracking control method according to claim 6, wherein said digital filter processing step has a pole to increase said open loop gain in said frequency area.

10. The tracking control method according to claim 6, wherein said digital filter processing step comprises a step of sampling said positional error at a predetermined sampling cycle and executing digital filter processing by the processor.

11. A tracking control device for controlling an actuator for driving a head which at least reads a recording medium to a track position of said storage medium, comprising:
    a detection circuit for detecting a positional error with respect to said track from the read output of said head; and
    a servo control unit for controlling said actuator such that said head follows up said track according to said positional error,
    wherein said servo control unit comprises a digital filter for increasing gain in a frequency area where an open loop characteristic of a tracking servo system by said servo control part is higher than the phase cross-over frequency f6 and lower than the higher resonance frequency f9 of said carriage, such that the gain becomes higher than the open loop gain of said phase cross-over frequency f6 in a range where the gain does not becomes OdB or more at a frequency where the phase becomes $(-180+360\times N)°$.

12. The tracking control device according to claim 11, wherein said digital filter is a filter to increase gain so that the open loop characteristic of said tracking servo system has a gain higher than the open loop gain of said phase cross-over frequency f6 in a frequency area which is higher than the phase cross-over frequency f6, lower than the higher resonance frequency f9 of said carriage and where phase is less than −180° and more than −540°.

13. The tracking control device according to claim 11, wherein said digital filter is a filter to increase said gain so that said open loop gain is OdB or more in said frequency area.

14. The tracking control device according to claim 11, wherein said digital filter has a pole to increase said open loop gain in said frequency area.

15. The tracking control device according to claim 11, wherein said digital filter comprises a processor which samples said positional error at a predetermined sampling period and executes digital filter processing.

* * * * *